US012739262B2

(12) United States Patent
Burton

(10) Patent No.: US 12,739,262 B2
(45) Date of Patent: Sep. 15, 2026

(54) DETECTING ALGORITHMICALLY GENERATED DOMAINS IN REGISTERED DOMAIN DATA

(71) Applicant: Infoblox Inc., Santa Clara, CA (US)

(72) Inventor: Renée Carol Burton, Seattle, WA (US)

(73) Assignee: Infoblox Inc., Santa Clara, CA (US)

( * ) Notice: Subject to any disclaimer, the term of this patent is extended or adjusted under 35 U.S.C. 154(b) by 38 days.

(21) Appl. No.: 18/753,961

(22) Filed: Jun. 25, 2024

(65) Prior Publication Data

US 2025/0106226 A1 Mar. 27, 2025

Related U.S. Application Data

(60) Provisional application No. 63/540,289, filed on Sep. 25, 2023.

(51) Int. Cl.

*H04L 9/40* (2022.01)
*G06F 16/28* (2019.01)
*G06F 16/901* (2019.01)

(52) U.S. Cl.

CPC ........ *H04L 63/1416* (2013.01); *G06F 16/285* (2019.01); *G06F 16/9024* (2019.01)

(58) Field of Classification Search

None

See application file for complete search history.

(56) References Cited

U.S. PATENT DOCUMENTS

2012/0084860 A1 4/2012 Cao
2019/0089721 A1* 3/2019 Pereira .................. G06F 16/951
2021/0168160 A1 6/2021 Wang

OTHER PUBLICATIONS

Jiang et al., Identifying Suspicious Activities through DNS Failure Graph Analysis, The 18th IEEE International Conference on Network Protocols, 2010, pp. 144-153.

A.M. Johansen, Monte Carlo Methods, ScienceDirect, International Encyclopedia of Education (Third Edition), 2010, pp. 1-10, https://www.sciencedirect.com/topics/medicine-and-dentistry/monte-carlo-method.

Antonakakis et al., Detecting and Tracking the Rise of DGA-Based Malware, ;login: the magazine of USENIX & SAGE, vol. 37, No. 6, Dec. 2012, pp. 15-24.

Christopher Kim, VexTrio DDGA Domains Spread Adware, Spyware, and Scam Web Forms, Infoblox, Jun. 6, 2022, pp. 1-25, https://blogs.infoblox.com/cyber-threat-intelligence/cyber-threat-advisory/vextrio-ddga-domains-spread-adware-spyware-and-scam-web-forms/.

Lee et al., DGA-based malware detection using DNS traffic analysis, Proceedings of the Conference on Research in Adaptive and Convergent Systems, Sep. 2019, pp. 1-3, https://dl.acm.org/doi/abs/10.1145/3338840.3355672.

(Continued)

*Primary Examiner* — Cai Y Chen

(74) *Attorney, Agent, or Firm* — Van Pelt, Yi & James LLP

(57) ABSTRACT

Various techniques for detecting algorithmically generated domains in registered domain data are disclosed. In some embodiments, a system/process/computer program product for detecting algorithmically generated domains in registered domain data includes collecting registered domain names; generating a graph of the registered domain names and outlier substrings associated with each of the registered domain names; and generating a set of registered DGA domain clusters based on an automated analysis of the graph.

18 Claims, 10 Drawing Sheets

| Sample Domains |
|---|
| aaaaa866[.]com |
| aa993366aa[.]com |
| aa112233aa[.]com |
| aa665566aa[.]com |
| aa558877aa[.]com |
| aa993377aa[.]com |
| aa665577aa[.]com |
| aa889933aa[.]com |
| aa887788aa[.]com |
| aaaaa661[.]com |
| aaaaa566[.]com |

(56) References Cited

OTHER PUBLICATIONS

Lucian Constantin, The Prometheus traffic direction system is a major player in malware distribution, CSO Online, Jan. 19, 2022, pp. 1-6, https://www.csoonline.com/article/571867/the-prometheus-traffic-direction-system-is-a-major-player-in-malware-distribution.html.
NetworkX, Software for complex networks, NetworkX Documentation, downloaded Sep. 22, 2023, 1 page, https://networkx.org.
Renee Burton, Suspicious DGA Domains, Discovered in DNS, Turn up in Malware Campaigns, Infoblox, Aug. 18, 2023, pp. 1-10, https://blogs.infoblox.com/cyber-threat-intelligence/suspicious-dga-domains-discovered-in-dns-turn-up-in-malware-campaigns/.
Sklearn, sklearn.feature_extraction.text. TfidfVectorizer, scikit-learn 1.3.1 documentation, downloaded Sep. 22, 2023, pp. 1-8, https://scikit-learn.org/stable/modules/generated/sklearn.feature_extraction.text.TfidfVectorizer.html.
Spark, MLlib—Feature Extraction and Transformation, Spark 1.4.1 Documentation, downloaded Sep. 22, 2023, pp. 1-9, https://spark.apache.org/docs/1.4.1/mllib-feature-extraction.html.
Stefanovic et al., The N-Grams Based Text Similarity Detection Approach Using Self-Organizing Maps and Similarity Measures, MDPI, Applied Sciences, published May 7, 2019, pp. 1-14.
Wikipedia, Domain generation algorithm, downloaded Sep. 25, 2023, pp. 1-4, https://en.wikipedia.org/wiki/Domain_generation_algorithm.

* cited by examiner

| Sample Domains |
| --- |
| aaaaa866[.]com |
| aa993366aa[.]com |
| aa112233aa[.]com |
| aa665566aa[.]com |
| aa558877aa[.]com |
| aa993377aa[.]com |
| aa665577aa[.]com |
| aa889933aa[.]com |
| aa887788aa[.]com |
| aaaaa661[.]com |
| aaaaa566[.]com |

FIG. 1

| Domain Name | Set of Length 4 Substrings |
|---|---|
| aaaaa866[.]com | {aaaa, aaaa, aaa8, aa86, a866} |
| aa993366aa[.]com | {aa99, a993, 9933, 9336, 3366, 366a, 66aa} |
| aaaaa661[.]com | {aaaa, aaaa, aaa6, aa66, a661} |
| aa665566aa[.]com | {aa66, a665, 6655, 6556, 5566, 566a, 66aa} |

FIG. 2

| **Substring** | **Frequency** | **Keep?** |
|---|---|---|
| aaaa | 10 | yes |
| 77aa | 8 | yes |
| aa66 | 7 | yes |
| 5566 | 1 | no |
| a661 | 1 | no |

FIG. 3

| Substring | Domains |
| --- | --- |
| aaaa | aaaaa866[.]com<br>aaaaa661[.]com<br>aaaaa566[.]com |
| 77aa | aa558877aa[.]com<br>aa993377aa[.]com<br>aa665577aa[.]com |
| aa66 | aa665566aa[.]com<br>aa665577aa[.]com<br>aaaaa661[.]com |

FIG. 4

| Example Registered DGA Domain Detections |
| --- |
| sleamconnmunity[.]ru,**staem**cammunlty.ru,**staem**commumity[.]ru,**staem**comm**unlity**.net[.]ru,staemcomm**unlity**.org[.]ru,staemcomunllty.net[.]ru,staemcomunlty.net[.]ru,staemcomunlty.org[.]ru,staemscommrunitiy[.]ru,steadpllc[.]com,steamcccommunity[.]com,steamccommyniity[.]net.ru,steamccommyniity[.]org.ru,steamccommynlty[.]net.ru,steamccomunnlty[.]net.ru,steamccomunnlty[.]org.ru,steamcommanity[.]com,steamcomminlty[.]ru,steamcommnutiy[.]com,steamcommrrnlty[.]ru,steamcommunitity[.]ru,steamcommunitiu[.]com |
| **dlmate**51[.]xyz,dlmate52[.]xyz,dlmate53[.]xyz,dlmate54[.]xyz,dlmate55[.]xyz,dlmate56[.]xyz,dlmate57[.]xyz,dlmate58[.]xyz,dlmate59[.]xyz,dlmate61[.]xyz,dlmate63[.]xyz,dlmate64[.]xyz,dlmate65[.]xyz,dlmate66[.]xyz,dlmate67[.]xyz,dlmate68[.]xyz,dlmate69[.]xyz |
| **greetmenow**hny.ru[.]com,greetmenowhod.ru[.]com,greetmenowhoz.ru[.]com,greetmenowhpe.ru[.]com,greetmenowhqn.ru[.]com,greetmenowhum.ru[.]com,greetmenowhux.ru[.]com,greetmenowhvd.ru[.]com,greetmenowhwy.ru[.]com,greetmenowhzf.ru[.]com,greetmenowiav.ru[.]com,greetmenowibu.ru[.]com,greetmenowick.ru[.]com,greetmenowidj.ru[.]com |

FIG. 6

DETECTING ALGORITHMICALLY GENERATED DOMAINS IN REGISTERED DOMAIN DATA

CROSS REFERENCE TO OTHER APPLICATIONS

This application claims priority to U.S. Provisional Patent Application No. 63/540,289 entitled DETECTING ALGORITHMICALLY GENERATED DOMAINS IN REGISTERED DOMAIN DATA filed Sep. 25, 2023, which is incorporated herein by reference for all purposes.

BACKGROUND OF THE INVENTION

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names). Web addresses are translated into IP addresses. The Domain Name System (DNS) is responsible for performing this translation from web addresses into IP addresses. Specifically, requests including web addresses are sent to DNS servers that generally reply with corresponding IP addresses or with an error message in case the domain has not been registered, a non-existent domain.

BRIEF DESCRIPTION OF THE DRAWINGS

Various embodiments of the invention are disclosed in the following detailed description and the accompanying drawings.

FIG. 1 is an example of a series of domains that were all observed for the first time within a brief time range in accordance with some embodiments.

FIG. 2 is a table that includes examples of substring extraction from the domains in accordance with some embodiments.

FIG. 3 is a table that includes a frequency count of each substring extracted from the domains in accordance with some embodiments.

FIG. 4 is a table that includes each substring mapped to the domains that include them in accordance with some embodiments.

FIG. 6 is an example of generated domains that are lookalikes in accordance with some embodiments.

DETAILED DESCRIPTION

Figure 5:
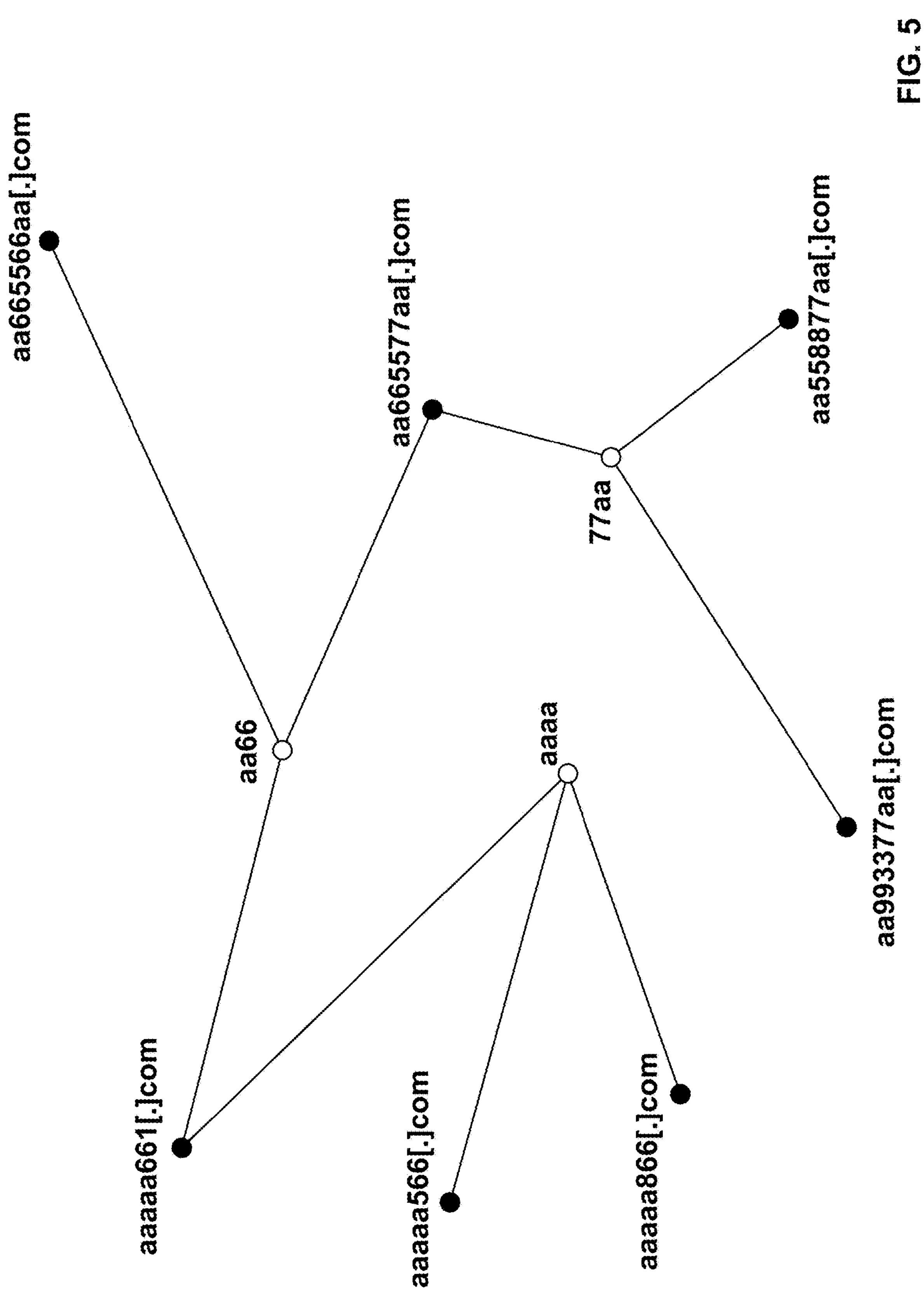
FIG. 5 is a substring-domain graph in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names (FQDNs)). Web addresses are translated into IP addresses. The Domain Name System (DNS) is responsible for performing this translation from web addresses into IP addresses. Specifically, requests including web addresses are sent to DNS servers that generally reply with corresponding IP addresses or with an error message in case the domain has not been registered, a non-existent domain (e.g., an NX Domain response is returned by DNS servers for a non-existent domain).

The Domain Name System (DNS) is a globally distributed database that provides core functionality for the operation of the Internet and local intranets. In particular, DNS provides the ability to locate Internet resource information, for example, IP addresses for domain names. The distributed nature of the DNS allows this resource information to be updated dynamically and controlled by the resource holders. To locate the current information, a client device, for example, a laptop, queries the DNS via a standard protocol. In practice, client devices do not perform the database lookup, referred to as resolution, themselves, but depend on other specialized servers to act on their behalf. These servers are called DNS recursive resolvers (e.g., a DNS recursor), and they are able to expedite the resolution of DNS records for a large number of clients through caching and optimized software. Recursive resolvers can also enact policies, for example, to limit client access to the Internet or specific resources.

Technical Challenges for DNS Security

Domain Generation Algorithms (DGAs) are used to create a large number of domain names for use in the domain name system (DNS). They were first seen used for malicious activity in 2008 and gained popularity over the next decade as a mechanism for compromised devices, or botnets, to reach command and control (C2) servers (see, e.g., https://en.wikipedia.org/wiki/Domain_generation_algorithm). The driver for DGAs was to circumvent detection of malware by anti-virus software which searched executables for hard-coded domain names and IP addresses. With a DGA, the malware within the infected device has an algorithm which generates an endless stream of domain names, sometimes dependent on time or other factors, and makes a DNS query to resolve the domain name. In turn, the malicious actor registers only a handful of the potential domains. Most of the DNS queries will result in an NXDOMAIN, or no such domain, response. Once the impacted device receives an IP address, it makes a connection with the C2 server and continues its operations. The traditional implementation of DGAs as associated with botnets revolves around having a large number of possible domain names generated by the algorithm and a small number of registered domains. The problem of identifying DGAs of this kind is very well studied, and while actors have adapted their techniques in an attempt to evade detection, the basic mechanisms remain the same (see, e.g., https://www.usenix.org/system/files/login/articles/login1212_antonakakis.pdf; and https://dl.acm.org/doi/abs/10.1145/3338840.3355672).

Malicious actors began using DGA algorithms in a fundamentally different way in recent years, using the algorithms to create large sets of registered domains to use as an infrastructure. This use case is not studied in the literature and previous approaches are not effective. Thus, new and improved techniques for DNS security, and specifically, new and improved techniques for detecting algorithmically generated domains in registered domain data, are needed.

Overview of Techniques for Detecting Algorithmically Generated Domains in Registered Domain Data Accordingly, various techniques for detecting algorithmically generated domains in registered domain data are disclosed.

Specifically, a different use case for DGAs, which is referred to herein as registered DGAs, is addressed. Instead of a traditional DGA approach that resides on an infected device and generates a large number of domains, most of which are not registered, the disclosed techniques are directed to automatically detect a different DGA approach in which domain generation algorithms are used by nefarious actors to generate large numbers of domains for registration (e.g., the automatically generated domains, or at least a subset thereof, are actually registered with a domain name registrar). Malicious actors can then use one or more of these registered domains to perform potentially malicious activities, such as to distribute malware, ads, and/or other illegal or undesired content or perform other malicious/undesired activities (e.g., command and control (C2)/botnet activities, etc.).

In some cases, the sets of registered generated domains are used for isolated malicious campaigns active over a relatively brief period of time. In other cases, the sets of registered generated domains may be part of an ongoing, continually changing network (see, e.g., https://blogs.infoblox.com/cyber-threat-intelligence/suspicious-dga-domains-discovered-in-dns-turn-up-in-malware-campaigns/). This network may be used as a traffic distribution system (TDS) or to facilitate, for example, spam operations (see, e.g., https://www.csoonline.com/article/571867/the-prometheus-traffic-direction-system-is-a-major-player-in-malware-distribution.html). As an example, we have observed registered DGA networks that have persisted over three years and that were responsible for delivering malicious or undesirable content to a significant portion of Internet users (see, e.g., https://blogs.infoblox.com/cyber-threat-intelligence/cyber-threat-advisory/vextrio-ddga-domains-spread-adware-spyware-and-scam-web-forms/).

In the botnet scenario, the domain generation algorithm typically resides on the infected devices in the malware. In contrast, in the scenario described herein, the domain generation algorithm is maintained as private to the domain owner and is not generally known (e.g., is typically not distributed and executed on computing devices of other entities/users). For example, some registrars offer such domain generation algorithms as a service to their customers that allow them to specify the number of domains that they wish to have automatically generated. An actor creating a registered DGA network can create thousands of domains in a single day or only a handful. We have observed both patterns, in which a large number of domains (e.g., thousands of domains) are registered all at once, and in other cases, only a handful, such as 20-30 domains, are registered slowly over a period of time (e.g., a week, a month, etc.). The domains may be used soon after registration or, as is often more common today, held back for days or weeks to avoid detection by security solutions (e.g., as use of a recently registered domain is often used as an indicator of a potential malware domain).

Although both traditional DGAs and registered DGAs (RDGAs) use algorithms to generate domain names, the technical challenge of detecting these generated domain names is quite different. There exist various approaches to attempt to detect such traditional DGAs, and the body of literature around the detection and monitoring of traditional DGAs is significant and continues to grow. Research in this area of detection and monitoring of traditional DGAs typically leverages characteristics of the domain names, the surge in NXDOMAIN response for queries from a device, and timing information. Because these traditional DGAs are embedded in malware, they are typically reverse engineered upon discovery, and detectors are built as signatures similar to the use of Yara rules for detecting malware variants.

As such, the existing approaches used for traditional DGAs are not effective for detecting registered DGA networks. In particular, there are no NXDOMAIN responses in the registered domains scenario (e.g., as such domains are actually registered prior to use). Also, there is rarely a pattern of queries from a user device. Moreover, the entropy characteristics for the domain names are generally different than in the traditional DGA scenario.

Given that registered DGAs make up a sizable portion of all newly registered or observed domains every day, there exists a significant and unmet need for their effective and efficient detection.

Accordingly, various techniques for detecting algorithmically generated domains in registered domain data are disclosed.

In some embodiments, a system/process/computer program product for detecting algorithmically generated domains in registered domain data includes collecting registered domain names; generating a graph of the registered domain names and outlier substrings associated with each of the registered domain names; and generating a set of registered DGA domain clusters based on an automated analysis of the graph.

For example, highly effective techniques for detecting registered DGAs from passive DNS logs, domain name registration data, and/or other sources of domain data (e.g., including large-scale domain data) are disclosed below with respect to various embodiments. The domain generation algorithms themselves (i.e., for registered DGAs) are diverse and, as a result, no single approach is necessarily effective at detecting them all. As such, in some embodiments, a set of independent, complimentary techniques are disclosed that can effectively and efficiently address large classes of domain generation algorithms to detect domains with low false positive rates to address this problem for registered DGAs, as will be further described below.

Thus, new and improved techniques for detecting algorithmically generated domains in registered domain data are disclosed.

Example Embodiments for Detecting Algorithmically Generated Domains in Registered Domain Data Thus, new and improved techniques for detecting algorithmically generated domains in registered domain data are disclosed.

Specifically, techniques for automatically detecting a major subclass of registered DGAs (RDGAs) are disclosed. This type of DGA is generally used to register domains in which the generator uses a common substring between two subsequently created domain names. The domains are either registered or observed in DNS queries over a time window (e.g., of a few days). While one can use registration timestamps to identify simultaneously registered domains, the constraints of the disclosed detection techniques are looser. For example, we have found that domains observed within one to three days of each other are reliably discovered. Given that we do not have access to either the domain generation algorithms used or to all of the domains generated, the disclosed techniques are designed to facilitate automated discovery of related domains using only the domain names and observation time as will be further described below.

In an example implementation, as an initial stage for detecting algorithmically generated domains in registered domain data, a set of domains are collected that have been newly observed, or registered, with a brief time frame.

As a second stage, substrings of each domain name in the collected set of domains are automatically generated. In particular, as discussed above, the class of DGAs that we are detecting are connected to one another through substrings, such as will be further described below with respect to FIG. 1.

FIG. 1 is an example of a series of domains that were all observed for the first time within a brief time range in accordance with some embodiments. Let us now consider an example of this type of DGA. In the example below, we have a series of domains that were all observed for the first time within a brief time range (e.g., within one to three days). These domains are all within the .com top-level-domain (TLD), but the disclosed techniques can discover them across multiple TLDs as well. In this case, we can see that the registrant used a series of the letter "a" along with integers in the domain names. We will use a small sample of these domains throughout the disclosed example embodiments as our working example.

FIG. 2 is a table that includes examples of substring extraction from the domains in accordance with some embodiments. Specifically, in a next stage, substrings for every newly observed domain are automatically computed. In this example implementation, the length of the substrings is a configurable parameter, and different data sets may be configured with different substring lengths for reliable results (e.g., typically lengths of three or four characters are effective based on our experiments and testing). Specifically, for each domain, a set of substrings of the fixed length starting with the first character of the domain is automatically generated, typically removing the TLD. For example, if we were using length four substrings, the domain aaaaa866[.]com would result in the set of substrings {aaaa, aaaa, aaa8, aa86, a866}. The table in FIG. 2 includes more examples of substring extraction.

In this example implementation, the substrings can be automatically computed by extracting n-grams based on Term Frequency-Inverse Document Frequency (TF-IDF) (e.g., using machine learning (ML) techniques, such as implemented using the publicly available SKLearn library, such as available at https://scikit-learn.org/stable/modules/generated/sklearn.feature_extraction.text.TfidfVectorizer.html, and/or Spark library, such as available at https://spark.apache.org/docs/1.4.1/mllib-feature-extraction.html).

In this example implementation, we do not use all possible substrings. Instead, we only use the starting and ending substring, referred to as the prefix and suffix substring. The primary reason for this is to reduce complexity. As we are going to create a graph from the results later, the less nodes we have, the less likely we are to have coincidental interactions and the less costly from a computational complexity is the implementation for generating and computing the graph and relationship calculations from the graph. As such, we can lose some RDGA clusters from this computational optimization, but the number is relatively insignificant in comparison to the potential noisy or false positives from using all strings. Various other optimizations can similarly be performed to meet various data set requirements. In an alternative embodiment, this and/or other optimizations are not performed (e.g., generating and graphing all possible substrings, etc.).

FIG. 3 is a table that includes a frequency count of each substring extracted from the domains in accordance with some embodiments. Substrings like this are often used in information retrieval to identify related items (see, e.g., https://www.mdpi.com/2076-3417/9/9/1870). In many such applications, substrings that occur frequently in the data set are discarded. However, in our use case, we want to identify those that occur abnormally often in the data. As a result, how often every substring is present in the data is automatically computed and all but those that are statistical outliers are discarded. To accomplish this, any common statistical method on the count of each substring can be used. An example of what these results can include is provided in the table shown in FIG. 3.

The original set of substrings computed in this stage of the processing can be extremely large, but after filtering we will have reduced the set by 90% or more, depending on the filtering method utilized for the filtering operation. Even with exceptionally large data sets, the resulting number of tokens is typically quite manageable. For example, in DNS data, we typically use a dataset of 200,000-600,000 domains every day. The number of 4-long substrings will be highly dependent on the environment.

FIG. 4 is a table that includes each substring mapped to the domains that include them in accordance with some embodiments. In this next stage of processing, the outlier substrings are mapped back to domains that contain them. For each substring, we will then have a corresponding list of domains. For example, using the substrings included in the table shown in FIG. 3, we obtain the mapping illustrated in the table shown in FIG. 4.

FIG. 5 is a substring-domain graph in accordance with some embodiments. Given this set of data at this stage of processing, a graph is automatically generated in which the nodes are made up of substrings and domains. This type of graph is generally referred to as a bipartite graph. An edge exists between a substring-node and a domain-node if the domain contains the substring. This graph is composed of connected components in which any two nodes are connected through a set of edges. The domains within a connected component represent a putative DGA cluster (e.g., the set of domains within a connected component like the one visualized in FIG. 5 are all part of a putative DGA set). Referring to FIG. 5, a visualization of an example substring-domain graph is provided. This example graph is a connected component, as there is an edge connecting every domain in this example visualization. Specifically, the nodes in this graph are 4-long substrings and domain names.

In an example implementation, the bipartite graph can be automatically generated using a publicly available graph algorithm with token nodes and edges (e.g., such as implemented using the publicly available NetworkX Python library/package, such as available at https://networkx.org/).

As a result, the putative DGA set shown in FIG. 5 includes these domains: aaaaa866[.]com, aaaaa661[.]com, aaaaa566[.]com, aa558877aa[.]com, aa665577aa[.]com, aa993377aa[.]com, aa665566aa[.]com. In this case, even though aaaaa661[.]com and aa558877aa[.]com do not share any 4-long substrings, we are able to associate them together because, within a brief period of time, the substrings aa66 and 77aa were observed with an unusually high frequency within newly observed domains. Within the large-scale of DNS domain names, these clusters may contain domain names that appear completely unrelated to one another, but are connected through a series of substrings using the disclosed techniques.

At the end of this stage of processing, the domain names in the original set have been divided into distinct subsets. Depending on the circumstances, it can be useful to filter these sets to remove sets that are either too small or too large. Other filters that can be applied in the processing can include common information retrieval techniques, such as so-called stop words, in which substrings that are deemed likely to create false connections are automatically ignored/disregarded. The choice of a stop word set is generally situational/context-dependent, but can include, for example, terms such as 'mail' or 'net,' for example, within our example use case for domain names.

FIG. 6 is an example of generated domains that are lookalikes in accordance with some embodiments. By combining information retrieval techniques with statistical outliers and graph analysis processing techniques, the disclosed techniques can efficiently and effectively identify a large number of registered DGA domains every day in DNS query logs and in domain registration data. The domain name generators can typically produce a variety of domains, as shown in the examples further discussed below. In practice, the clusters of detected domains discovered using the disclosed techniques can range in size from about 10-15,000 domains each day. They may occur in a single TLD or, as the example of domains that are lookalikes to the game company Steam as shown in FIG. 6, can cover multiple TLDs. A cluster can have one or many substrings that tie it together. In the example illustrated in FIG. 6, two substrings (i.e., "staem" and "unlity") are seen for the cluster of Steam lookalike domains.

While the disclosed techniques for registered DGA detection are highly effective at identifying both small and large clusters of registered DGAs, there are risks of noisy clusters. By noisy clusters, we are generally referring to a discovered cluster of domains that contain a combination of domains created by a generator algorithm and other domains that coincidentally share substrings.

An example of a noisy cluster is shown below.

anpost-customs-payment[.]com, anpost-delivery-payment[.]com, anpost-feepayment[.]com, bakentertainment[.]com, bitdigitalsettlement[.]com, chowmanagement[.]com, cracanada-government[.]com, marbconstructionmanagement[.]com, marticliment[.]com, mctrpament[.]com, stratotainment[.]com,upriserecruitment[.]com In this case, the disclosed techniques correctly discovered part of a set of generated domains that included anpost-customs-payment[.]com, anpost-delivery-payment[.]com, and anpost-feepayment[.]com. However, it linked those to domains that were clearly not generated by the same domain generation algorithm and were unrelated to one another. In this example, this is due to the substring "ment" that ties together the generated domains with the others.

One approach to manage this coincidental mapping of domain names is to create stop word lists as similarly discussed above. This is common in information retrieval use cases. When used, all substrings within the list would be removed from consideration early on in the algorithm. This generally works very well for finding similar phrases as in the information retrieval scenarios. However in our use case, the common tokens such as "ment" and "mail" are also highly likely to be used by the malicious registered DGAs. As such, removing these substrings from consideration can hinder recovery of the entire domain cluster.

Accordingly, in some embodiments, to remove noisy clusters from the final results, a statistical machine learning classifier is applied to each cluster (e.g., in an example implementation, an ML statistical classifier can be applied to filter out unrelated domains using features/feature vectors unrelated to domain name, such as ASNs, name servers, registrar, and/or other features can be similarly used; alternatively, other ML classifiers that can be similarly used include a random forest and/or logistic regression-based ML classifiers).

As an example, three strong features that can be used in a binary classifier are the following: (1) the domain registrar; (2) the authoritative name server; and (3) the hosting ISP or autonomous system. Threat actors who register large numbers of domains algorithmically for use in malicious activity tend to either utilize a single registrar, name server, and/or hosting service, or, in an effort to obfuscate their actions, utilize many. In other words, a set of DGA domains is likely to be registered with a single or many registrars.

Figure 7:
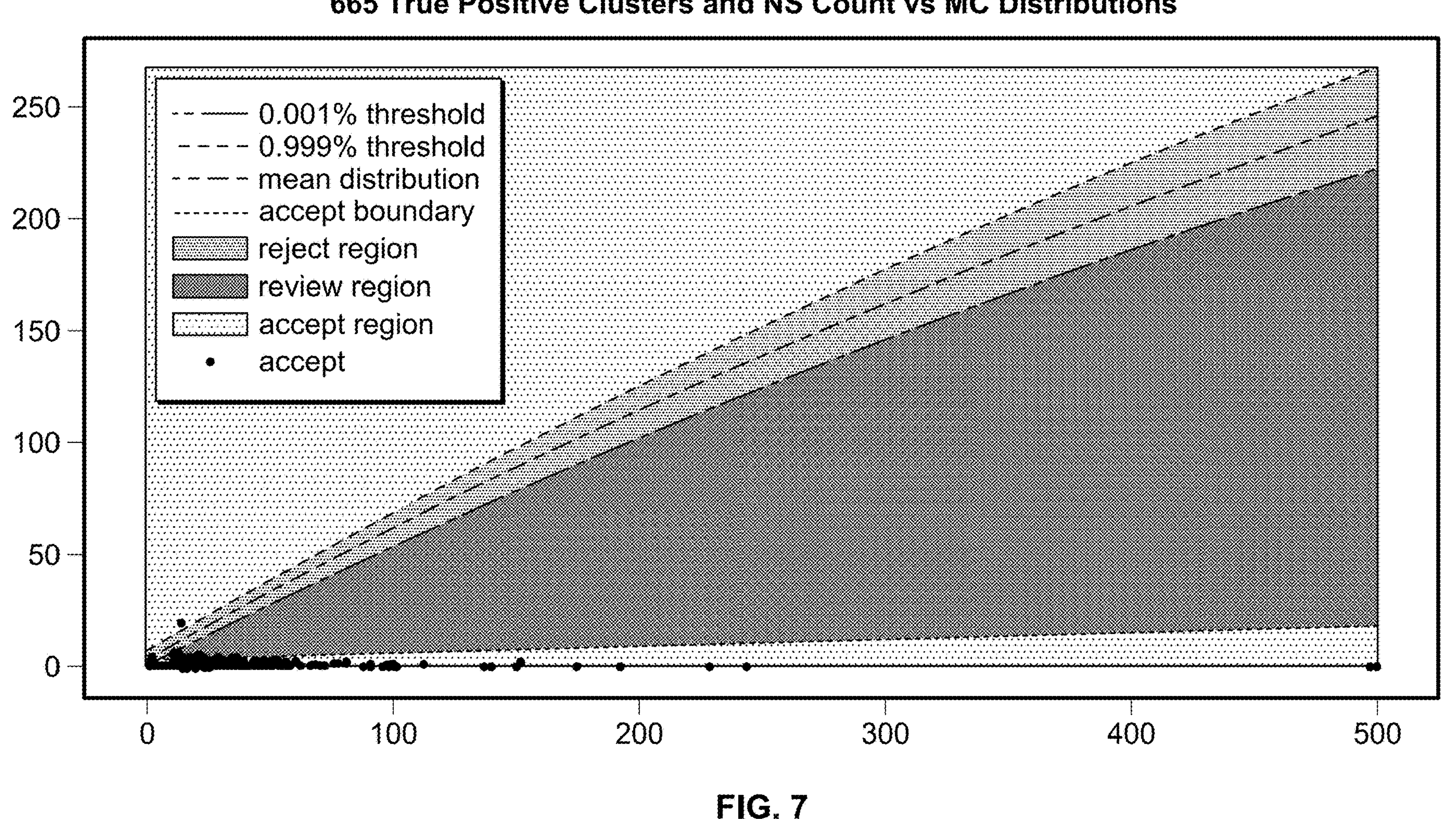
FIG. 7 is a chart illustrating discovered cluster size versus number of name server domains for the cluster in accordance with some embodiments.

FIG. 7 is a chart illustrating discovered cluster size versus number of name server domains for the cluster in accordance with some embodiments. Referring to FIG. 7, we see the number of name servers for a set of over 300 discovered DGA clusters based on experiments (e.g., using the Monte Carlo method as further discussed below). Along the x-axis is the size, or number of domains, within the cluster. Along the y-axis is the number of name server domains for that cluster. These results have been evaluated to determine whether the cluster was noisy or not. Clusters that were noisy are marked in the reject region as shown, while those that are pure, or contain no unrelated domains, are in the accept region as shown. In particular, the vast majority of pure clusters have a small number of name server domains, relative to the cluster size, while some have a substantial number. Overall we can see that the registered DGA detection algorithm described above is highly effective, as there are only a handful of noisy clusters in the set.

FIG. 7 also includes three lines that indicate the expected number of name servers for a random set of domains of any given size; a fourth line shows the acceptance threshold for our statistical model. These lines show that if the cluster contained unrelated domains, chosen at random, the distribution of the number of expected name servers, specifically in relation to the mean of the sample distribution, and those between the 0.1% and 99.9% quantile thresholds. For example, a cluster above the 0.999% line is a set of domains which is served by more name servers than would be expected in 99.9% of clusters of the same size picked at random. A cluster below the 0.001% line is one that contains less nameservers than 99.9% of those created with a random draw of domains.

As also shown in FIG. 7, registered DGA clusters occur both above the high distribution line and well below the low distribution line. As a result, in order to capture the full breadth of registered DGA activity, a two-sided decision boundary can be applied as shown in FIG. 7. Specifically, the disclosed machine learning/statistical learning classifier can account for the behavior of threat actors to use either very common, or very uncommon, name server infrastructure. Similar behavior is observed using registrar and hosting features for registered DGAs.

A persistent challenge to the use of machine learning or statistical learning classifiers for large-scale applications is obtaining sufficient labeled training data and acquiring new labels over time to retrain. By labeled data, we mean that the cluster produced by the initial algorithm is evaluated for noise and labeled as noisy or pure. Manual labeling is resource intensive and with large clusters is error prone.

To address this challenge, a random model can be created with a large corpus of DNS and registration data using the Monte Carlo method. The random model can be used to statistically distinguish between clusters which contain unrelated domains and those that are part of the same DNS infrastructure. We draw a large number of random samples from the corpus for a range of cluster sizes and compute their features (e.g., the number of name servers). Each of these samples creates a distribution at the sample size, from which we can take a mean, median, and calculate quantiles. Similarly, from the sample distribution at each fixed size, we can calculate the distribution across all sizes for the mean, or any fixed quantile or p-value. The three top lines shown in FIG. 7 are an example of the distribution curves for the mean, 0.001, and 0.999 values based on a large set of Monte Carlo experiments. We refer to these sample distributions, across sample sizes, as the Monte Carlo distributions.

We initially fit polynomials to the Monte Carlo distributions and establish low and high acceptance boundaries for the putative clusters. Based on the application, we set an acceptable false positive rate. In our research, we found that different thresholds for accepting low and high counts can be used to maximize effectiveness.

In addition, we establish soft decision lines within a small range of the boundaries to capture clusters which may be in the range of error. This is adjusted to be fairly low and those clusters are sent for human review, along with sample clusters that are deemed likely to be noisy. Through a fairly small number of human reviews we are able to accrue labels to update the model. We additionally use negative feedback from users to label clusters that are automatically submitted.

Figure 8:
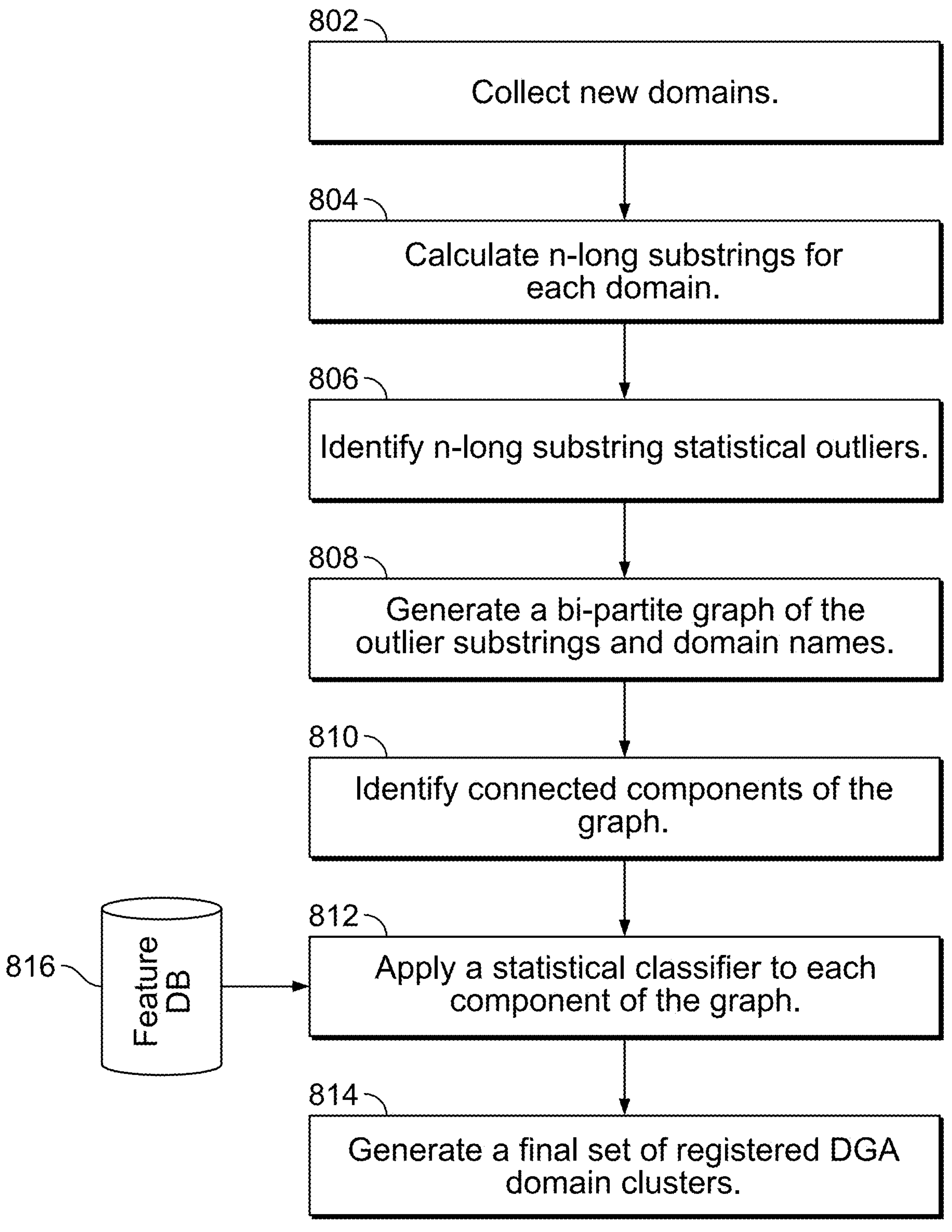
FIG. 8 is a flow diagram of a process for detecting algorithmically generated domains in registered domain data in accordance with some embodiments.

FIG. 8 is a flow diagram of a process for detecting algorithmically generated domains in registered domain data in accordance with some embodiments. The process illustrated in FIG. 8 can be performed using the system, components, and disclosed techniques as similarly described above with respect to FIGS. 1-7 as will now be further described below.

Referring to FIG. 8, at 802, new domains are collected (e.g., registered domain names data), such as similarly described above with respect to FIG. 1.

At 804, n-long substrings for each domain are calculated (e.g., the substrings can be automatically computed by extracting n-grams based on Term Frequency-Inverse Document Frequency (TF-IDF)), such as similarly described above with respect to FIG. 2.

At 806, n-long substring statistical outliers are identified, such as similarly described above with respect to FIG. 3.

At 808, a bi-partite graph of the outlier substrings and domain names is generated, such as similarly described above with respect to FIGS. 4 and 5.

At 810, connected components of the graph are identified, such as similarly described above with respect to FIG. 5.

At 812, a statistical classifier is applied to each component of the graph (e.g., an ML statistical classifier can be applied to filter out unrelated domains using features/feature vectors unrelated to domain name, such as ASNs, name servers, registrar, and/or other features can be similarly used, such as stored in a feature data store/database (DB) as shown at 816; alternatively, other ML classifiers that can be similarly used include a random forest and/or logistic regression based ML classifiers), such as similarly described above with respect to FIG. 6.

At 814, a final set of registered DGA domain clusters is generated, such as similarly described above with respect to FIG. 7. As further described below, the disclosed techniques can be applied for various DNS or other security solutions, such as providing a DNS detection and response system at a DNS recursive resolver as will be further described below.

As an example, on a typical day from an initial set of over 200,000-600,000 domains, we can isolate 130-150 clusters of registered DGA domains containing anywhere between 10,000-50,000 domains. Based on our experiments and testing, we have observed registered DGA systems within upwards of 80,000 domains registered in a short period of time.

In an example implementation, an application for the disclosed techniques for detecting algorithmically generated domains in registered domain data is a DNS detection and response system at a DNS recursive resolver. In this example implementation, the domains that are automatically identified as part of a registered DGA are deemed suspicious domains that can be configured to be blocked for resolution at the DNS recursive resolver (e.g., based on a DNS security policy). As such, if a DNS request is made for that domain name, the DNS recursive resolver will not respond with the correct IP address. This prevents the client from accessing the domain. In the event that there is malicious or unwanted content at the domain name, the user is protected. This application is sensitive to false positives, as the user will also not be able to reach legitimate content if the domain access is blocked. We have found that the disclosed techniques for detecting algorithmically generated domains in registered domain data can provide exceptional false positive rates, with no false positives (FPs) reported in a three month period of testing and over a million domains blocked during that period of time.

As will now be apparent to one of ordinary skill in the art in view of the disclosed embodiments, the disclosed techniques for detecting algorithmically generated domains in registered domain data can similarly be applied to various other DNS, networking, security, and/or other applications to provide enhanced security for enterprises and/or other entities and/or users.

Additional example process embodiments for detecting algorithmically generated domains in registered domain data will now be further described below.

Figure 9:
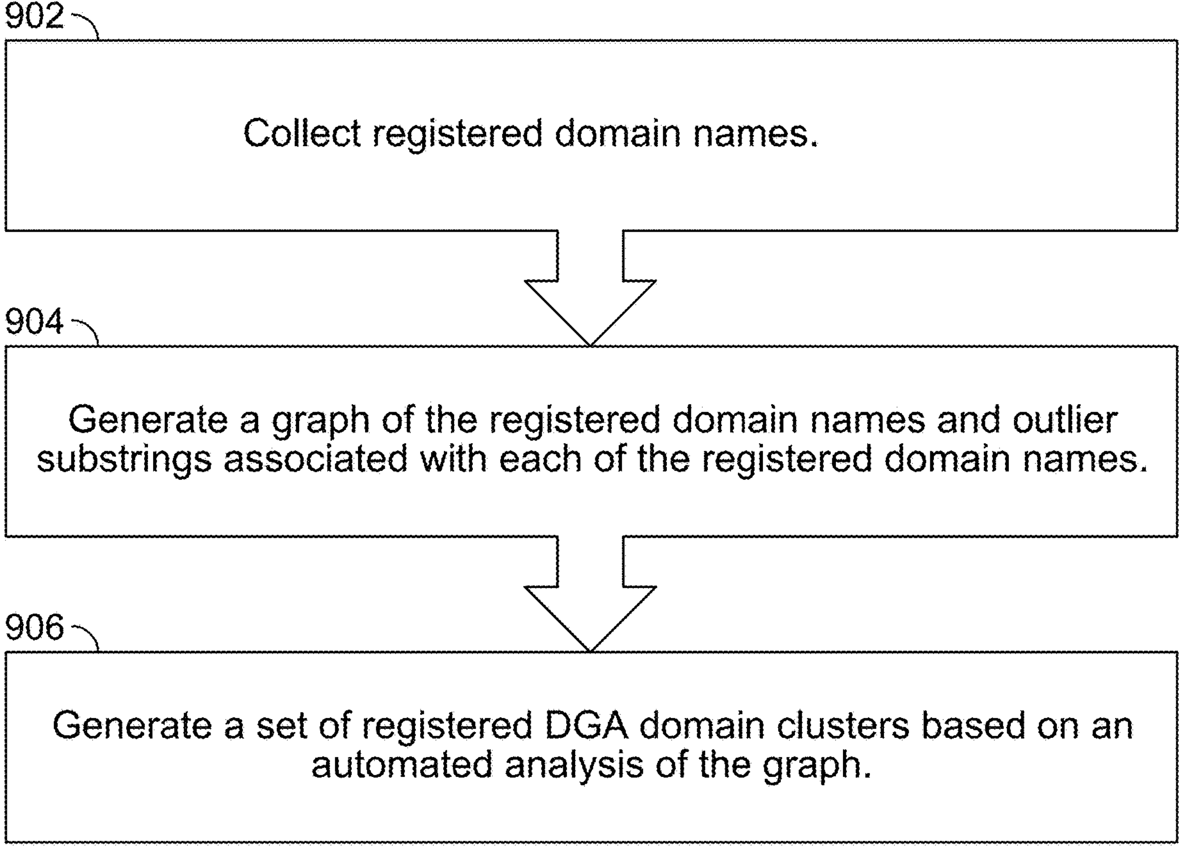
FIG. 9 is another flow diagram for detecting algorithmically generated domains in registered domain data in accordance with some embodiments.

Example Process Embodiments for DNS Tunneling Detection by Applying Natural Language Processing Anomaly Features FIG. 9 is another flow diagram for detecting algorithmically generated domains in registered domain data in accordance with some embodiments. In some embodiments, a process as shown in FIG. 9 is performed for detecting algorithmically generated domains in registered domain data using techniques as similarly described above including the embodiments described above with respect to FIGS. 1-8.

At 902, collecting registered domain names is performed, such as similarly described above.

At 904, generating a graph of the registered domain names and outlier substrings associated with each of the registered domain names is performed, such as similarly described above with respect to FIGS. 1-8.

At 906, generating a set of registered DGA domain clusters based on an automated analysis of the graph is performed, such as similarly described above with respect to FIGS. 1-8.

Figure 10:
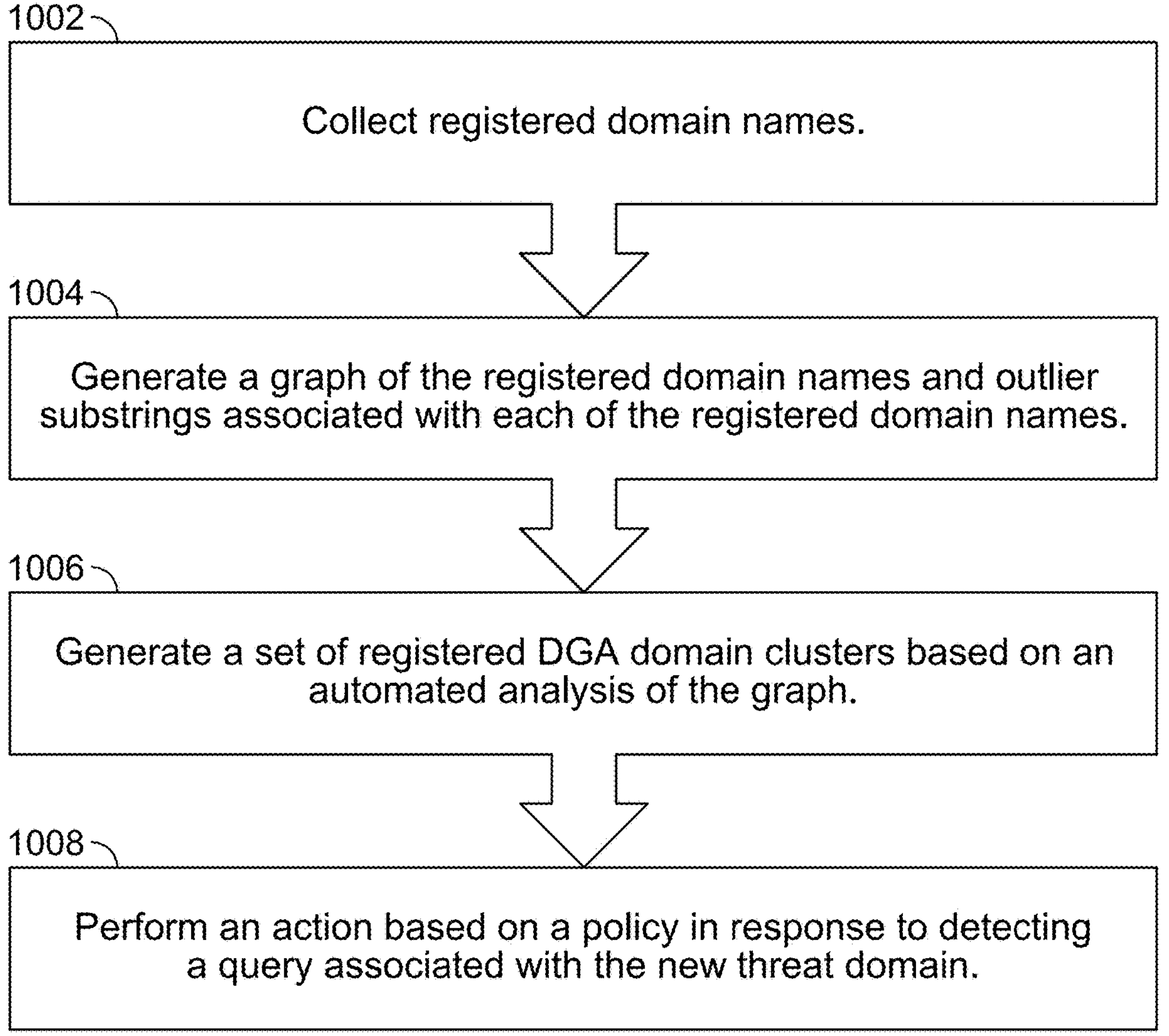
FIG. 10 is another flow diagram for detecting algorithmically generated domains in registered domain data in accordance with some embodiments.

FIG. 10 is another flow diagram for detecting algorithmically generated domains in registered domain data in accordance with some embodiments. In some embodiments, a process as shown in FIG. 10 is performed for detecting algorithmically generated domains in registered domain data using techniques as similarly described above including the embodiments described above with respect to FIGS. 1-8.

At 1002, collecting registered domain names is performed, such as similarly described above.

At 1004, generating a graph of the registered domain names and outlier substrings associated with each of the registered domain names is performed, such as similarly described above with respect to FIGS. 1-8.

At 1006, generating a set of registered DGA domain clusters based on an automated analysis of the graph is performed, such as similarly described above with respect to FIGS. 1-8.

At 1008, an action is performed based on a policy in response to detecting a query associated with the new threat domain. For example, the action can include one or more of the following: (1) block the threat domain at a DNS security platform based on a policy; (2) generate an alert in response to detecting a query associated with the threat domain at a DNS security platform based on a policy; (3) report the threat domain; (4) add the threat domain to a block list; (5) quarantine the threat domain; and (6) automatically generate a new DNS signature for the threat domain.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

collect registered domain names;

generate a graph of the registered domain names and outlier substrings associated with each of the registered domain names, comprising to:

identify a set of n-long substrings for a registered domain name of the registered domain names, wherein each n-long substring of the set of substrings has a fixed length of characters;

determine that a frequency count of an n-long substring from the set of n-long substrings falls within a range of acceptable frequency counts;

in response to a determination that the frequency count of the n-long substring from the set of substrings falls within the range of acceptable frequency counts, remove the n-long substring from the set of n-long substrings to obtain a remaining set of n-long substrings; and generate the graph using the registered domain names and the remaining set of n-long substrings; and generate a set of registered DGA domain clusters based on an automated analysis of the graph; and a memory coupled to the processor and configured to provide the processor with instructions.

2. The system recited in claim 1, wherein the registered domain names are collected from a plurality of sources including domains names that have been newly observed or registered within a predetermined period of time.

3. The system recited in claim 1, wherein the graph is a bi-partite graph.

4. The system recited in claim 1, wherein the graph is a bi-partite graph, wherein connected components of the graph are identified, and wherein each component of the graph is automatically classified using a statistical classifier.

5. The system recited in claim 1, wherein a new threat domain is identified based on being associated with one or more of the set of registered DGA domain clusters.

6. The system recited in claim 1, wherein a new threat domain is identified based on being associated with one or more of the set of registered DGA domain clusters, and wherein the processor is further configured to:

perform an action based on a policy in response to detecting a query associated with the new threat domain.

7. The system recited in claim 1, wherein a new threat domain is identified based on being associated with one or more of the set of registered DGA domain clusters, and wherein the processor is further configured to:

block the new threat domain at a DNS security platform based on a policy.

8. The system recited in claim 1, wherein a new threat domain is identified based on being associated with one or more of the set of registered DGA domain clusters, and wherein the processor is further configured to:

generate an alert in response to detecting a query associated with the new threat domain at a DNS security platform based on a policy.

9. The system recited in claim 1, wherein a new threat domain is identified based on being associated with one or more of the set of registered DGA domain clusters, and wherein the processor is further configured to:

report the new threat domain.

10. The system recited in claim 1, wherein a new threat domain is identified based on being associated with one or more of the set of registered DGA domain clusters, and wherein the processor is further configured to:

add the new threat domain to a block list.

11. The system recited in claim 1, wherein a new threat domain is identified based on being associated with one or more of the set of registered DGA domain clusters, and wherein the processor is further configured to:

quarantine new the threat domain.

12. The system recited in claim 1, wherein a new threat domain is identified based on being associated with one or more of the set of registered DGA domain clusters, and wherein the processor is further configured to:

automatically generate a new DNS signature for the new threat domain.

13. A method, comprising:

collecting registered domain names;

generating a graph of the registered domain names and outlier substrings associated with each of the registered domain names, comprising:

identifying a set of n-long substrings for a registered domain name of the registered domain names, wherein each n-long substring of the set of substrings has a fixed length of characters;

determining that a frequency count of an n-long substring from the set of n-long substrings falls within a range of acceptable frequency counts;

in response to a determination that the frequency count of the n-long substring from the set of substrings falls within the range of acceptable frequency counts, removing the n-long substring from the set of n-long substrings to obtain a remaining set of n-long substrings; and generating the graph using the registered domain names and the remaining set of n-long substrings; and generating a set of registered DGA domain clusters based on an automated analysis of the graph.

14. The method of claim 13, wherein the registered domain names are collected from a plurality of sources including domains names that have been newly observed or registered within a predetermined period of time.

15. The method of claim 13, wherein the graph is a bi-partite graph.

16. The method of claim 13, wherein the graph is a bi-partite graph, wherein connected components of the graph are identified, and wherein each component of the graph is automatically classified using a statistical classifier.

17. The method of claim 13, wherein a new threat domain is identified based on being associated with one or more of the set of registered DGA domain clusters.

18. A computer program product embodied in a non-transitory computer readable medium and comprising computer instructions for:

collecting registered domain names;

generating a graph of the registered domain names and outlier substrings associated with each of the registered domain names, comprising:

identifying a set of n-long substrings for a registered domain name of the registered domain names, wherein each n-long substring of the set of substrings has a fixed length of characters;

determining that a frequency count of an n-long substring from the set of n-long substrings falls within a range of acceptable frequency counts;

in response to a determination that the frequency count of the n-long substring from the set of substrings falls within the range of acceptable frequency counts, removing the n-long substring from the set of n-long substrings to obtain a remaining set of n-long substrings; and generating the graph using the registered domain names and the remaining set of n-long substrings; and generating a set of registered DGA domain clusters based on an automated analysis of the graph.

* * * * *